(12) United States Patent
Bliss et al.

(10) Patent No.: US 9,995,530 B2
(45) Date of Patent: Jun. 12, 2018

(54) METHOD FOR THE CAPTURE OF CARBON DIOXIDE THROUGH CRYOGENICALLY PROCESSING GASEOUS EMISSIONS FROM FOSSIL-FUEL POWER GENERATION

(71) Applicants: Charles Bliss, Springfield, VA (US); Mason Charles Moseley, Fairfax, VA (US)

(72) Inventors: Charles Bliss, Springfield, VA (US); Mason Charles Moseley, Fairfax, VA (US)

( * ) Notice: Subject to any disclaimer, the term of this patent is extended or adjusted under 35 U.S.C. 154(b) by 0 days. days.

(21) Appl. No.: 15/052,076

(22) Filed: Feb. 24, 2016

(65) Prior Publication Data

US 2017/0241707 A1  Aug. 24, 2017

(51) Int. Cl.
*F25J 3/04* (2006.01)
*F25J 3/02* (2006.01)
*F25J 3/06* (2006.01)

(52) U.S. Cl.
CPC ......... *F25J 3/04412* (2013.01); *F25J 3/0266* (2013.01); *F25J 3/04018* (2013.01); *F25J 3/04084* (2013.01); *F25J 3/04157* (2013.01); *F25J 3/04193* (2013.01); *F25J 3/04296* (2013.01); *F25J 3/04303* (2013.01); *F25J 3/04309* (2013.01); *F25J 3/04393* (2013.01); *F25J 3/04533* (2013.01); *F25J 3/04563* (2013.01); *F25J 3/04612* (2013.01); *F25J 3/04618* (2013.01); *F25J 3/066* (2013.01); *F25J 3/067* (2013.01); *F25J 2205/20* (2013.01);

(Continued)

(58) Field of Classification Search
CPC ........ F25J 3/067; F25J 3/0266; F25J 2210/80; F25J 2205/20; F25J 2210/04; F25J 2210/70
See application file for complete search history.

(56) References Cited

U.S. PATENT DOCUMENTS 4,662,916 A * 5/1987 Agrawal .............. F25J 3/04157
62/646
5,632,143 A * 5/1997 Fisher ..................... F01K 23/10
60/39.181

(Continued)

*Primary Examiner* — Brian King
(74) *Attorney, Agent, or Firm* — Howard M. Cohn; Daniel M. Cohn (57) ABSTRACT

A cryogenic method for capturing carbon dioxide in the gaseous emissions produced from the fossil-energy combustion of solid, liquid, or gaseous fossil fuels in a power generation installation employing an OxyFuel mode of combustion. The method includes: producing essentially pure carbon dioxide under elevated pressure and at near ambient temperatures in a Carbon-Dioxide Capture Component from the carbon-dioxide content of at least a part of the gaseous emissions produced from fossil-energy fueled combustion in the Oxyfuel mode of combustion; separating atmospheric air in an Air Separation Component into a stream of liquid nitrogen and a stream of high-purity oxygen; supplying low temperature, compressed purified air to a cryogenic air separation unit (cold box) within the Air Separation Component; collecting low temperature thermal energy from coolers employed within the Carbon-Dioxide Capture Component and the Air Separation Component; and converting the collected thermal energy to electricity within a Thermal-Energy Conversion Component.

13 Claims, 7 Drawing Sheets

(52) U.S. Cl.
CPC ........ *F25J 2210/04* (2013.01); *F25J 2210/42* (2013.01); *F25J 2210/70* (2013.01); *F25J 2230/02* (2013.01); *F25J 2230/04* (2013.01); *F25J 2235/80* (2013.01); *F25J 2240/40* (2013.01); *F25J 2245/02* (2013.01); *F25J 2245/42* (2013.01); *F25J 2250/42* (2013.01); *F25J 2260/44* (2013.01); *F25J 2260/80* (2013.01); *F25J 2270/904* (2013.01); *Y02C 10/04* (2013.01); *Y02C 10/12* (2013.01); *Y02E 20/344* (2013.01)

(56) References Cited

U.S. PATENT DOCUMENTS

| | | | |
|---|---|---|---|
| 6,314,755 B1* | 11/2001 | Schoenecker | F25J 3/0409 |
| | | | 62/643 |
| 6,492,149 B1 | 12/2002 | Muller-Feuga | |
| 2008/0178739 A1 | 7/2008 | Lewnard et al. | |
| 2008/0190024 A1 | 8/2008 | Hobbs | |
| 2009/0049748 A1 | 1/2009 | Day et al. | |
| 2009/0151241 A1 | 6/2009 | Dressler et al. | |
| 2009/0294354 A1 | 12/2009 | Theodore et al. | |
| 2009/0305388 A1 | 12/2009 | Dressler et al. | |
| 2010/0011778 A1 | 1/2010 | Knight et al. | |
| 2010/0190227 A1 | 7/2010 | Dauth et al. | |
| 2010/0285576 A1 | 11/2010 | Norbeck et al. | |
| 2010/0297739 A1 | 11/2010 | Steiner et al. | |
| 2010/0304452 A1 | 12/2010 | Oyler | |
| 2011/0003357 A1 | 1/2011 | Barclay et al. | |
| 2011/0287507 A1 | 11/2011 | Martin et al. | |
| 2012/0167622 A1* | 7/2012 | Cognard | F25J 3/04018 |
| | | | 62/645 |
| 2013/0111948 A1* | 5/2013 | Higginbotham | B01D 53/002 |
| | | | 62/617 |

\* cited by examiner

METHOD FOR THE CAPTURE OF CARBON DIOXIDE THROUGH CRYOGENICALLY PROCESSING GASEOUS EMISSIONS FROM FOSSIL-FUEL POWER GENERATION

TECHNICAL FIELD OF THE INVENTION

The present invention relates generally to the capture of carbon dioxide in the gaseous emissions produced from the combustion of fossil fuels and more particularly to its capture as a high-purity, high-pressure supercritical fluid, which is suitable for transport in a pipe line to a place for its utilization or sequestration.

BACKGROUND OF THE INVENTION

The worldwide industrial revolution of the past two centuries changed the global energy scene from essentially total global reliance on renewable energy forms as the driving force for the world economies to global reliance almost entirely on fossil energy forms. The consequences of this global change are elevated carbon-dioxide content in the atmosphere and perceived potential for a consequential deleterious climate change.

Accordingly, worldwide concern exists to identify and develop means to protect against the prospect of deleterious climate change, by capturing carbon dioxide produced from fossil-fuel combustion before it can be emitted to the atmosphere. This concern is expressed in two complementary ways. In one, regulatory authorities establish enforceable standards for fossil-fuel use that limit carbon dioxide emissions to the atmosphere by whatever means are practical. In the other, research and development enterprises demonstrate potentially cost-effective technologies that suppress emissions of carbon dioxide to the atmosphere through its capture for disposal by means other than emission to the atmosphere.

The technological means for carbon dioxide capture that are generally being researched and demonstrated are based on the use of an agent, which may be an inorganic or organic chemical, usually water soluble. For one selected set of temperature and pressure, the agent absorbs carbon dioxide from its presence in diluted form in conventional gaseous emissions and liberates (desorbs) the absorbed carbon dioxide in a pure form from the agent under a different selected set of temperature and pressure. The use of an organic amine as the agent is widely accepted in industry for extracting carbon dioxide from a variety of gases. Interest also exists, for example, in the use of an inorganic ammonium-carbonate/ammonium-bicarbonate aqueous solution.

SUMMARY OF THE INVENTION

The present invention enables a simultaneous capture of carbon dioxide and the provision of a supply of oxygen sufficient to support Oxyfuel combustion. Each of these functions is accomplished in a separate processing component, within which either gaseous emissions for carbon dioxide capture or atmospheric air for air separation is compressed in multiple stages. Intercooling between stages and aftercooling after the final compression stage liberate significant quantities of relatively low-temperature thermal energy. A third processing component captures this low-level thermal energy and converts it to electricity. The net effect is a significant reduction of the electricity required to support compressing gaseous emissions and atmospheric air that would otherwise be supplied from external sources.

Thus, the performances of these three processing components are interrelated. For convenience, these three components are labeled 'Carbon-Dioxide Capture Component', 'Air-Separation Component', and 'Thermal-Energy Conversion Component'.

In the Carbon-Dioxide Capture Component, compression of the gaseous emissions occurs, illustratively, in multiple stages, which raises the gaseous emissions from an entering pressure essentially ambient to a final pressure suited to ultimate carbon-dioxide liquefaction and subsequent pumping to pipe-line transport pressure. Intercooling between compression stages occurs with an Upper Refrigerant. Aftercooling from the final compression stage occurs by reheating in parallel, separately, the captured carbon dioxide and the tail gas. Further cooling from the final compression stage and for complete condensation of the captured carbon dioxide is accomplished, illustratively and conventionally, in a condenser in which the heat of condensation is extracted by the Lower Refrigerant. The water-vapor content of the gaseous emissions is recovered as a liquid from the intercoolers and prior to aftercooling and condensing the captured carbon dioxide. The tail gas ultimately is produced containing only traces of carbon dioxide and is delivered to the Air Separation Component.

The configuration in the Air-Separation Component conforms to commercially-available units, but with modifications to the supply of compressed air to the 'cold box' within which the separation occurs, by significantly reducing the temperature at which the compressed air is supplied to the 'cold box'. In addition the oxygen-rich tail gas from the Carbon-Dioxide Capture Component is recycled to the compressed air supply to reduce the intake of atmospheric air. Compression of the filtered, intake atmospheric air occurs, illustratively, in two stages with an intercooler between Stages 1 and 2 and an aftercooler after Stage 2. Intercooling between Stage 1 and Stage 2 occurs in a single cooler with an Upper Refrigerant. Aftercooling occurs in two parallel coolers, one with the Upper Refrigerant and the other with cooling water. Evaporation of the heated water in a conventional cooling-water circuit provides the rejection of thermal energy to the atmosphere, which is required by the second law of thermodynamics. Makeup water is provided in part from the condensed water produced in this component and from the Carbon-Dioxide Capture Component.

Aftercooling of compressed atmospheric air from a conventional booster compressor and a conventional turbine air-booster compressor, illustratively, occurs with a Lower refrigerant. The configuration of the Air Separation Component provides for the production of high-purity oxygen as a vapor near ambient conditions of temperature and pressure and nitrogen, as the Lower Refrigerant, as a liquid near atmospheric pressure. The liquid nitrogen as the Lower Refrigerant serves to provide the refrigeration for condensing the Upper Refrigerant and the compressed, captured carbon dioxide. The Air-Separation Component incorporates a heat exchanger to cool purified compressed air before it enters the 'cold box' by reheating vaporized Lower Refrigerant before it is vented to the atmosphere. In cases where this may be necessary, in order to provide sufficient liquid nitrogen to meet the demand of the condensers for the Lower Refrigerant and the captured carbon dioxide, a portion of the nitrogen vapor before venting is recycled to the intake of atmospheric air to the first stage atmospheric air compressor. Thereby, such recycling serves to increase the supply of liquid nitrogen as the Lower Refrigerant, when necessary.

In the Thermal-Energy Conversion Component, the Upper Refrigerant as a liquid collects low-temperature thermal energy mainly from intercooling and aftercooling in the Carbon-Dioxide Capture Component and in the Air Separation Component. The collected energy is then converted to electricity from the use of an Upper Refrigerant, now as a vapor, as the medium. The collected low-temperature thermal energy from the coolers in the Air Separation Component and the Carbon-Dioxide Capture Component vaporizes the Upper Refrigerant at high pressure before its pressure is reduced during a first-stage, turbo-expansion process for the generation of electricity.

The amount of pressure reduction is set such that limited condensation of the Upper Refrigerant occurs during expansion. Pressure reduction in the second stage, turbo-expansion process is set to produce a temperature, suited to the collection of low-temperature level, thermal energy from the coolers in the Carbon-Dioxide Capture Component and the Air Separation Component, which avoids freezing the moisture content in the gases being cooled. The amount of reheat between Stage 1 and Stage 2 of the expansion of the vaporized Upper Refrigerant is determined by the temperature required from the condensation of the Upper Refrigerant. This reheat is obtained from a cooler in the aftercoolers from the compression of air in the Air Separation Component. The pressure of the condensed Upper Refrigerant is raised by a pump to the level required for the collection of the low temperature-level thermal energy.

The Upper Refrigerant may be a chemical compound or a gaseous element whose thermodynamic properties lend themselves for operating at practical temperatures and pressures. Candidates may come from the series of fluorocarbon and fluorohydrocarbon compounds, generally designated by a number preceded by an"R" (1,1,1,2-tetrafluoroethane (R134a) is illustrative). Illustratively, other candidates may be considered such as ammonia, sulfur dioxide, propane and butane.

The Lower Refrigerant may be a chemical compound or a gaseous element whose thermodynamic properties lend themselves to operations at practical temperatures and pressures. Illustratively, liquid nitrogen is the choice because of its convenient supply from the Air Separation Component.

In general terms, the captured carbon dioxide may also be produced, all or in part, as a liquid at lowered pressure and as a low-pressure gas in situations where these alternatives can be marketed. Specifically, the present invention relates to carbon-dioxide capture from all, or part of, the gaseous emissions produced from the use of Oxyfuel combustion of a fossil fuel. These gases may contain variations in the content of carbon dioxide depending on the precise conditions of the OxyFuel combustion mode and fuel composition.

The present invention also relates to the incorporation of an Air Separation Component to provide the oxygen required for Oxyfuel combustion. The Air Separation Component also provides the supply of the Lower Refrigerant, which is the separated nitrogen, as a liquid.

The present invention also relates to the capture in the form of electricity of the low temperature-level thermal energy that is liberated within the Carbon-Dioxide Capture and Air Separation Components of the invention. The capture of carbon dioxide and the conversion of associated low-level thermal energy to electricity, which then reduces the consumption of electricity from external sources that otherwise would be needed for the operation of this invention, are primary purposes of this invention.

The present invention can also provide for the production of marketable argon from the Air Separation Component, as an option. Water vapor present in the gaseous emissions fed to the Carbon-Dioxide Capture Component and in the atmospheric air fed to the Air Separation Component is recovered as a liquid, which can be used as makeup in a conventional circulating-water, cooling-tower installation that is incorporated in this invention.

According to the present invention, installations can accept all of the gaseous emissions produced from a fossil-energy production plant, which means that the combustion of a fossil fuel can result in essentially 'zero' emissions of carbon dioxide to the atmosphere. However, regulatory agencies do not aim for 'zero' emissions. Instead, their aims are for reductions illustratively from about 25% to 50%. The difference between say 25% reduction and 100% reduction can be traded with another fossil-energy production installation, which has no provision for carbon dioxide capture. This approach, conventionally known as 'cap and trade', then allows a single large-capacity fossil-energy production plant to capture all of its carbon dioxide and trade the surplus above the regulatory requirement with a group of smaller-capacity, fossil energy generating plants, which then can avoid the installation of carbon-dioxide capture equipment, thereby complying with regulatory requirements. However, installations based on this invention can accept only a portion of the gaseous emissions such as to produce carbon-dioxide capture to the extent required by emissions regulations, thereby avoiding 'cap and trade'.

Definitions

Several terms, which are used in the narrative to describe this invention, are hereby defined in the interests of establishing clarity and simplicity when referring to them. These terms are:

Gaseous Emissions: The gases that result from the combustion of a fossil fuel that normally are emitted to the atmosphere from a chimney. These gases are largely inert nitrogen with a content of carbon dioxide to an extent depending on the carbon content in the fuel and with a content of water vapor to an extent depending on the hydrogen content of the fuel, the moisture content of the fuel, and the use of steam in the combustion process. The gases may contain small quantities of sulfur dioxide and trace elements such as mercury and other toxic substances, depending on the their contents in the fossil fuel and on the results of attempts to capture them before the gases reach the chimney. These gases contain some oxygen depending on the amount used in excess of the stoichiometric requirement for the combustion of the fossil fuel. Gaseous emissions before they reach the chimney are often referred to as 'flue gases', but a distinction is made here since flue gases may have a different composition from gases that are the gaseous emissions. Differences in composition arise because of processing that flue gases may undergo (e.g., flue gas desulfurization, selective catalytic reduction to remove nitrogen oxides) before they reach the chimney, and activated carbon absorption of mercury and toxic substances.

Oxygen-Enriched Combustion: The addition of high-purity oxygen (conventionally about 95% by volume) to the air used for the combustion of a fossil fuel. Consequently, the gaseous emissions produced, contain significantly decreased quantities of inert nitrogen. Oxygen enrichment can occur by the aforementioned addition and should not be confused with OxyFuel Combustion, which is the sole subject of this invention.

Oxyfuel Combustion: A mode of combustion of fossil fuels in which the use of atmospheric air is eliminated. Instead, a portion of the gaseous emissions is recycled to the fuel burners, which has previously been mixed with essentially pure oxygen to the extent that can match the oxygen content of the air. This mix thus substitutes for the conventional use of atmospheric air for combustion. As the result, the content of the gaseous emissions becomes largely carbon dioxide and water vapor. Only a small content of nitrogen and oxygen may exist along with trace quantities such as sulfur dioxide, mercury, and other toxic substances, depending on prior treatment of the gaseous emissions. Moreover, in the practice of OxyFuel Combustion, the amount of oxygen in the mixture may exceed the content of oxygen in atmospheric air to the extent that this enrichment in the mixture can be accommodated by temperatures in the furnace in which the fossil fuel is combusted.

Cooler: Equipment designed to allow exchange of thermal energy (heat) between a fluid being cooled and a fluid being heated, whose primary purpose is the cooling of fluids employed in this invention.

Condenser: A cooler in which a change of phase occurs, i.e., conversion of the fluid being cooled from a gas phase to a liquid phase.

Upper Refrigerant: A chemical compound whose temperature-related thermodynamic properties make it suitable for use in a cooler in which the fluid being cooled contains water vapor, without the possibility that solid (water-based) ice is formed within the cooler.

Lower Refrigerant: An element, or a chemical compound, whose temperature-related thermodynamic properties make it suitable for use in condensers for fluids that contain carbon dioxide or an upper refrigerant without the formation of solids because of freezing of these fluids within the condensers.

Air Separation Unit: A commercially-available, packaged processing unit, which is designed to separate high-purity oxygen from gaseous air. Conventionally, oxygen purity can range from about 95% to 99%+ by volume. In addition, the nitrogen content of the air can be produced either as an essentially pure vapor or as an essentially pure liquid. Such units can also be referred to as oxygen-nitrogen separation units when the oxygen content in the gases to be separated is less than its content in atmospheric air because, for example, the addition of recycled nitrogen vapors to the intake of gaseous air.

Tail Gas: The gas that remains after capture of the carbon dioxide content in the gaseous emissions. The tail gas contains significant oxygen with nitrogen and minor (trace) quantities of uncondensed carbon dioxide.

Fossil Energy: Combustible solid, liquid, or gaseous hydrocarbons, whose energy content is suitable for use as a fuel for the generation of pressurized steam. Examples of solid fuels are all ranks of coal from lignitic to anthracite and coke produced in petroleum refineries. Examples of liquid fuels are various hydrocarbons product in petroleum refineries conventionally known, for example, as No. 5 or No. 6 (bunker) fuels. Examples of gaseous fuels are natural gas (high methane content) and other gaseous hydrocarbons of varying compositions.

BRIEF DESCRIPTION OF THE DRAWINGS

The structure, operation, and advantages of the present invention will become further apparent upon consideration of the following descriptions taken in conjunction with the accompanying eight figures (FIGS.). The figures are intended to be illustrative, not limiting.

Certain elements in some of the figures may be omitted, or illustrated not-to-scale, for illustrative clarity. Cross-sectional views (if any) may be in the form of "slices", or "near-sighted" cross-sectional views, omitting certain background pipe lines, which would otherwise be visible in a "true" cross-sectional view, for illustrative clarity.

In the drawings accompanying the description that follows, both reference numerals and legends (labels, text descriptions) may be used to identify elements. If legends are provided, they are intended merely as an aid to the reader, and should not in any way be interpreted as limiting.

DETAILED DESCRIPTION OF THE PREFERRED EMBODIMENTS

In the description that follows, numerous details are set forth in order to provide a thorough understanding of the present invention. It will be appreciated by those skilled in the art that variations of these specific details are possible while still achieving the results of the present invention. Well-known processing steps are generally not described in detail in order to avoid unnecessarily obfuscating the description of the present invention.

In the description that follows, exemplary dimensions may be presented for an illustrative embodiment of the invention. The dimensions should not be interpreted as limiting. They are included to provide a sense of proportion. Generally speaking, the relationship between various elements, where they are located, their contrasting compositions, and sometimes their relative sizes, is of significance.

In the drawings accompanying the description that follows, often both reference numerals and legends (labels, text descriptions) will be used to identify elements. If legends are provided, they are intended merely as an aid to the reader, and should not in any way be interpreted as limiting.

The structure, operation, and advantages of the present preferred embodiment of the invention will become further apparent upon consideration of the following description taken in conjunction with the accompanying drawings.

The present invention relates to a mode of combustion of fossil fuels, such as in a fossil-energy fueled power generation installation, in which the use of atmospheric air is eliminated. Instead, a portion of its gaseous emissions is recycled to the fuel burners, which has previously been mixed with essentially pure oxygen to the extent that can match the oxygen content of atmospheric air, commonly known as of OxyFuel Combustion. This mix thus substitutes for the conventional use of atmospheric air for combustion. As the result, the content of the chimney gases becomes largely carbon dioxide and water vapor. Only a small content of nitrogen and oxygen may exist along with trace quantities such as sulfur dioxide, mercury, and other toxic substances, depending on prior treatment of the gaseous emissions.

The technological means for carbon dioxide capture employed in the present invention is based on a cryogenic approach in which the capture of carbon dioxide occurs at temperatures sufficiently low and pressures sufficiently high such that, for example, the carbon dioxide liquefies through condensation from the gaseous emissions. The captured carbon dioxide liquid can then, if necessary, be pumped to the pressure required for pipe line transport to disposal other than into the atmosphere. This mode of carbon dioxide capture is enhanced by the minimization of the presence of nitrogen in the combustion system, especially by employing OxyFuel combustion.

Accordingly, a supply of essentially pure oxygen for the combustion of the fossil fuel in a fossil-energy fueled power generation installation is provided in accordance with the present invention by the incorporation of an Air Separation Component. Both the capture of carbon dioxide and the production of oxygen produce significant quantities of low temperature-level, by-product thermal energy because of intercooling and aftercooling during gas compression stages. The conversion of this by-product thermal energy to electricity is a unique feature of this invention.

Thus, the present invention may be perceived as comprising three interrelated components labeled the Carbon-Dioxide Capture Component, the Air Separation Component, and the Thermal-Energy Conversion Component, which serve a common purpose of the simultaneous capture of carbon dioxide, the provision of a supply of oxygen sufficient to support Oxyfuel combustion, and a minimized consumption of externally-supplied electricity. Each of these functions is accomplished in a separate processing component, within which either gaseous emissions for carbon dioxide capture or atmospheric air for air separation is compressed in multiple stages. Intercooling between stages and aftercooling after the final compression stage liberate significant quantities of relatively low-temperature thermal energy and this low temperature-level thermal energy is captured and converted to electricity.

Figure 1:
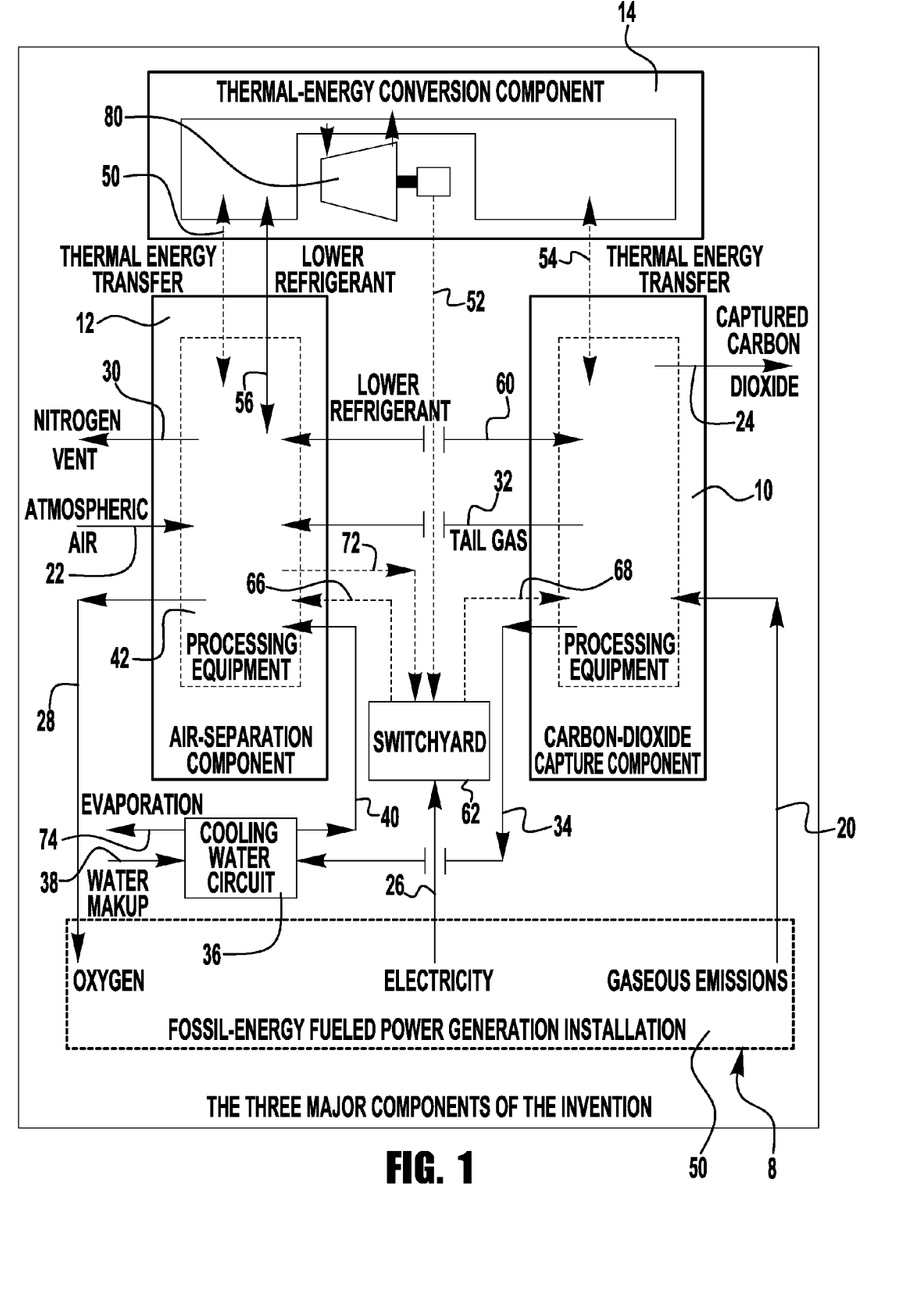
FIG. 1 is a schematic view of a fossil-energy fueled, power generation Installation that includes three interrelated components, i.e., the Carbon-Dioxide Capture Component, the Air Separation Component, and the Thermal-Energy Conversion Component, according to the present invention.

FIG. 1 is a schematic view of a fossil-energy fueled power generation installation 8, the three interrelated components of the present invention: the Carbon-Dioxide Capture Component 10, the Air Separation Component 12, and the Thermal-Energy Conversion Component 14. These three components are linked for the simultaneous capture of carbon dioxide and the provision of a supply of oxygen sufficient to support Oxyfuel combustion. The schematic view of FIG. 1 shows the receipt of a flow stream of gaseous emissions though pipeline 20 and of a flow stream of atmospheric air through pipe line 22, the output of a flow stream of captured carbon dioxide through pipe line 24, the supply of electricity through an electric line 26, the output of a flow stream of high-purity gaseous oxygen through pipe line 28, the venting of a flow stream of nitrogen through pipe line 30, and the directing of a flow stream of tail (recycle) gas through pipe line 32. It also shows these functions as being accomplished by the three interrelated processing components: the Carbon-Dioxide Capture Component 10, the Air Separation Component 12, and the Thermal-Energy Conversion Component 14.

The three processing Components 10, 12 and 14 are linked symbolically by the numbered flow streams represented by arrows indicating the direction of flow, as discussed herein below. Also shown is the recovery of water from the Carbon-Dioxide Capture Component 10, as discussed herein below. The recovery of water in the Carbon-Dioxide Capture Component 10 is directed through pipe line 34 to the Cooling Water Circuit 36 and mixed therein with the water makeup through pipe line 38 to provide a supply of water through pipe line 40 from the Cooling Water Circuit 36 to the processing equipment 42 in the Air Separation Component 12.

The gaseous emissions 20 are produced from Fossil-Energy Fueled Power Generation Installation 8 operating in an OxyFuel Combustion mode, in which the oxygen is supplied through pipe line 28 from the Air Separation Component 12. The Fossil-Energy Fueled Power Generation Installation 8 also supplies the net requirement of electricity through electric line 26, needed for the operation of the three interrelated processing components: the Carbon-Dioxide Capture Component 10, the Air Separation Component 12, and the Thermal-Energy Conversion Component 14 of the present invention.

The flow stream through pipe line 50 represents the supply of the Upper Refrigerant (in liquid form) from the Thermal-Energy Conversion Component 14 to the Air Separation Component 12 and its return as a vapor, after collecting low-level thermal energy for conversion to electricity. Similarly, the flow stream through pipe line 54 represents the supply of Upper Refrigerant (in liquid form) to the Carbon-Dioxide Capture Component 10 and its return as a vapor, after collecting low-level thermal energy for conversion to electricity. The flow stream through pipe line 56 represents the supply of the Lower Refrigerant as a liquid to the Thermal-Energy Conversion Component 14 for its use to condense the Upper Refrigerant and for its return as a vapor. The flow stream through pipe line 60 represents the supply of Lower Refrigerant to the Carbon Dioxide Capture Component 10 for its use in condensing captured carbon dioxide to a liquid and its return as a vapor.

The Switchyard 62 receives the electricity produced in the Thermal-Energy Conversion Component 14 stream through electric line 52 and the electricity through electric line 26 that is imported from the Fossil-Energy Fueled Power Generation Installation 8 to meet the total demand from an installation based on this invention. The switchyard 62 also distributes the combined quantities of electricity as required by the Air Separation Component 12 through electric line 66 and the Carbon Dioxide Capture Component through electric line 68. The Switchyard 62 also receives electricity that is generated by the expander in the Air Separation Component 12 through electric line 72.

The cooling-water circuit 36 is a conventional, cooling-tower based method for providing a stream of cooled water to the Processing Equipment 42 of the Air Separation Component 12 through pipe line 40 and receiving condensed water from the Carbon-Dioxide Capture Component 10 through pipe line 34. Makeup water is directed into the cooling-water circuit 36 through pipe line 38 to replace the evaporated water which is removed 74 from the cooling-water circuit to the atmosphere. The quantity of makeup water is reduced by the stream of condensate delivered to the cooling-water circuit 36 through pipe line 34 from the Carbon-Dioxide Capture Component 10 and internally in the Air Separation Component 12 from the stream of water condensed from the atmospheric air.

The functions and relationships illustrated in FIG. 1 are further clarified in FIGS. 2, 3, 4, and 5.

Figure 2:
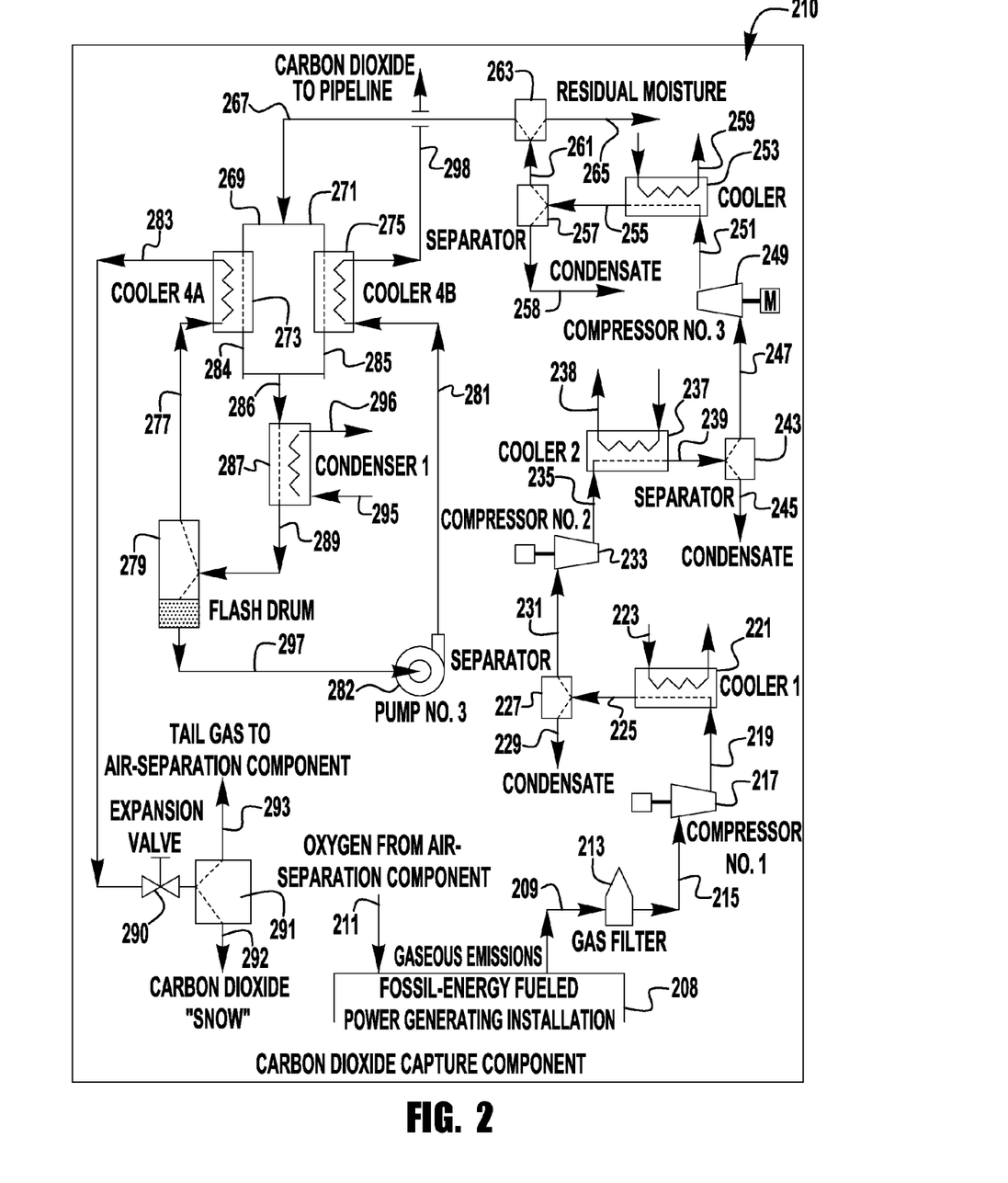
FIG. 2 illustrates the processing functions for the Carbon Dioxide Capture Component of FIG. 1, according to the present invention.

FIG. 2 illustrates the processing functions for the Carbon-Dioxide Capture Component 210 (compares to 10 in FIG. 1). A fossil-energy fueled power generating installation employing OxyFuel combustion 208 may comprise a single or multiple power-generating units, which singly, or together, supply all or part of the gaseous emissions through pipe line 209, from which the carbon dioxide content is to be captured. A stream of oxygen for combustion in the Fossil-Energy Fueled Power Generating Installation 8 is supplied from the Air Separation Component 12 (see FIG. 1) though pipe line 211 (corresponding to pipe line 28 in FIG. 1).

The stream of gaseous emissions flowing through pipe line 209 is first cleaned of particulate matter in the gas filter 213 and then moved through pipe line 215 to be compressed in the first-stage compressor 217. The stream of compressed gases is delivered through pipe line 219 from the first-stage compressor 217 to the cooler 221. The cooling medium 223 which flows through cooler 221 is the evaporation of the liquefied Upper Refrigerant. The stream of cooled compressed gases exiting cooler 221 flows through pipe line 225 and is then directed into separator 227, in which condensed water is separated and ejected through pipe line 229. A stream of the partially-dried gases from the separator 227 is directed through pipe line 231 into compressor 233. The further-compressed gases exit compressor 233 and are directed through pipe line 235 into cooler 237. The cooling medium 238, which flows through cooler 237, is the liquefied Upper Refrigerant. The cooled gases exiting cooler 237 are directed through pipe line 239 to separator 243 for the further removal of water condensate through pipe line 245.

The stream of residual gases are directed out of the separator 243 through pipe line 247 and delivered to third-stage compressor 249. The further-compressed gases exiting the third-stage compressor 247 through pipe line 251 are delivered to cooler 253 where they are cooled and delivered through pipe line 255 to separator 257, in which the condensed water is separated and removed through pipe line 258. The cooling medium 259, which flows through cooler 253, is liquefied Upper Refrigerant. The stream of residual gases is directed out of separator 257 and through pipe line 261 into dryer 263. After being processed in the dryer 263 for the complete removal of moisture, the stream is directed as residual moisture through pipe line 265.

The stream of completely-dried and finally compressed gases exiting dryer 263 through pipe line 267 is separated into two streams, one flowing through pipe line 269 and the other through pipe line 271. These two streams are separately, in parallel, fed to coolers 273 and 275. The stream of gases from pipe line 269 is cooled in cooler 273 by heat exchange with non-condensable (tail) gases flowing through pipe line 277 from the Flash Drum 279 in which liquefied carbon dioxide has been separated.

The stream of completely-dried and finally compressed gases flowing through pipe line 271 is cooled in cooler 275 by heat exchange with the stream of liquefied carbon dioxide flowing through pipe line 281 from Pump 282. The pressure of the liquefied carbon dioxide flowing in pipe line 297 from the Flash Drum 279 is increased by pump 282 to pipe line requirement. The heated carbon dioxide from cooler 275 is exported as a stream through pipe line 298 for utilization or sequestration. The heated tail gases exiting cooler 273 through pipe line 283 are further processed as described below.

The cooled gases exiting coolers 273 and 275, through pipe lines 284 and 285, respectively, are combined into a single stream flowing through pipe line 286. The stream of gases exiting pipe line 286 enters condenser 287 where they are cooled to condensing temperatures for the carbon dioxide content therein. The condensing medium flowing into pipe line 295 and in pipe line 296 is the Lower Refrigerant. The condenser effluent flows through pipe line 289 into the flash drum 279 for the separation of the liquefied carbon dioxide as a stream flowing into pipe line 297 and the non-condensable stream of gases, i.e., the tail gas, flows through pipe line 277.

The stream of separated tail gases flowing through pipe line 283 is reduced in pressure by an expansion valve 290 and fed immediately into conventional equipment 291 in which essentially all of the carbon dioxide content is converted to a solid carbon dioxide "snow" exiting through pipe line 292. The tail gases, now containing only traces of carbon dioxide, are sent through pipe line 293 (compare pipe line 32 in FIG. 1) to the Air Separation Component 12 as shown in FIG. 1.

Figure 3:
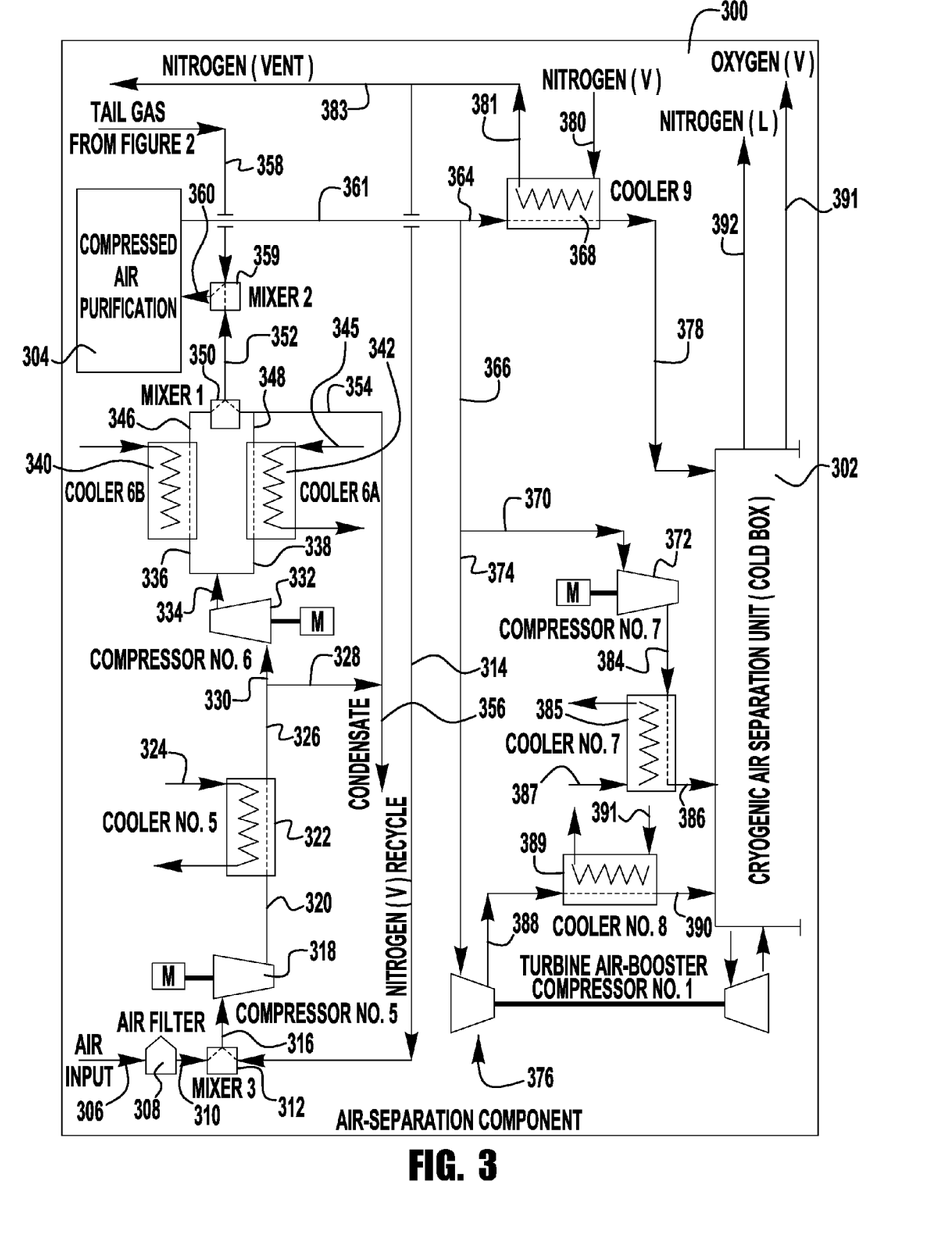
FIG. 3 illustrates the processing functions for the Air Separation Component of FIG. 1, according to the present invention.

FIG. 3 illustrates the processing for the Air Separation Component 300 (Compare 12 in FIG. 1). The cryogenic air-separation unit 302 (also identified as Cold Box) and the compressed-air purification unit 304 are conventional. However, the means for supplying purified compressed air for the cryogenic air-separation unit 302 are unique to this invention as will become evident from the description that follows.

Dust and other particulate matter in the atmospheric-air stream input flowing in pipe line 306 are removed by an air filter 308. The resulting stream of cleaned air is delivered through pipe line 310 to mixer 312. The mixer 312 also receives a stream of recycled nitrogen vapor through pipe line 314 on occasions when such recycle is required. The cleaned air and recycled nitrogen vapor are directed through pipe line 316 from the mixer 312 to a first-stage compressor 318.

The stream of compressed air exiting first-stage compressor 318 is directed through pipe line 320 to cooler 322. The cooling medium for the stream of compressed air flowing through the cooler 322 is the evaporation of the Upper Refrigerant 324 (Compare 438 in FIG. 4). The stream flowing through pipe line 326 is then separated with condensed water stream flowing into pipe line 328 while the other partially-dried stream flows through pipe line 330 into compressor 332.

Figure 4:
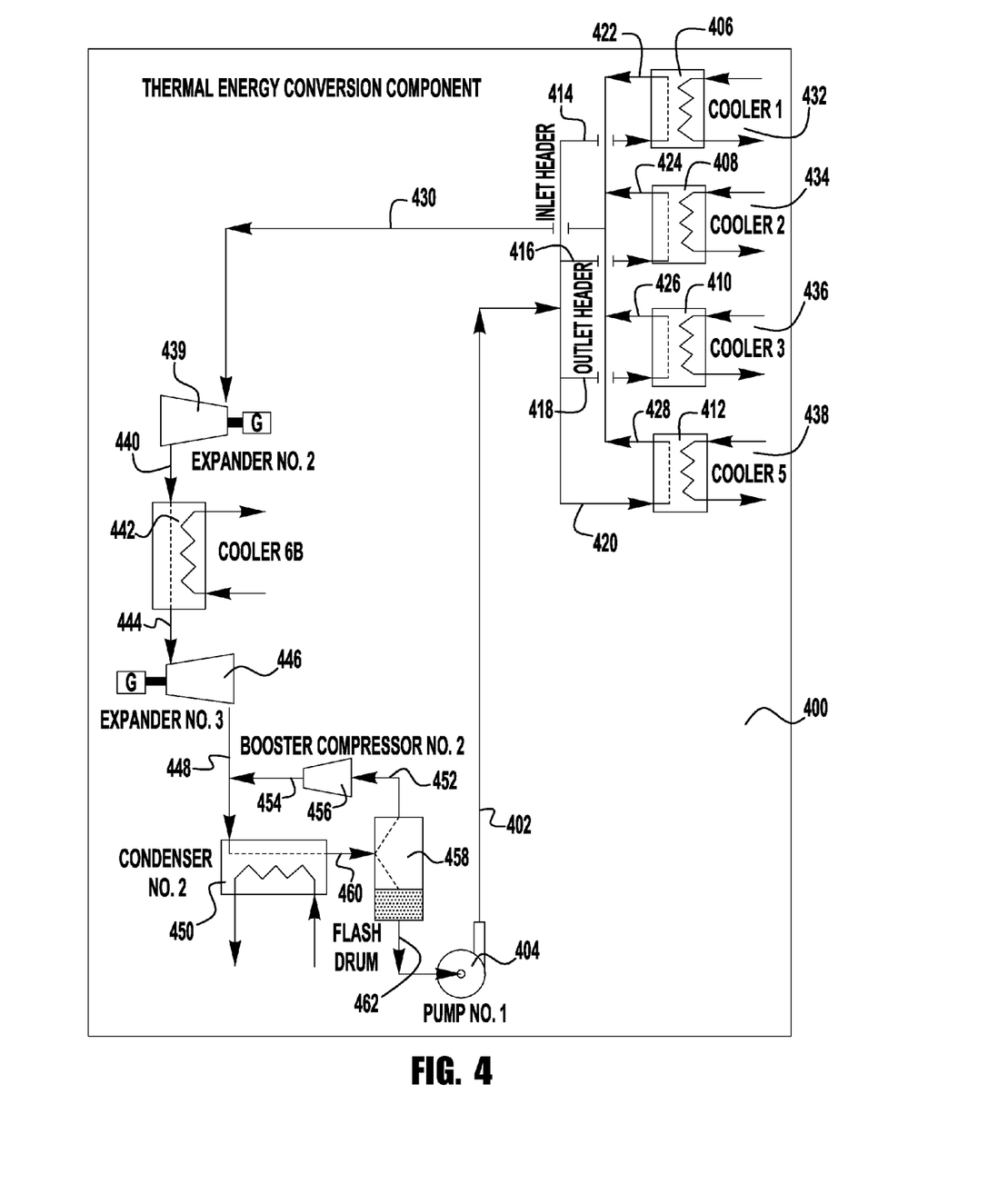
FIG. 4 illustrates the processing for the Upper Refrigerant in the Thermal Energy Conversion Component of FIG. 1, according to the present invention.

The further-compressed stream exits compressor 332 into pipe line 334 where it is divided into two streams, one flowing through pipe line 336 into cooler 340 and the other one flowing through pipe line 338 into cooler 342. The cooling medium 344 for cooler 340 is the reheat of the Upper Refrigerant as shown in FIG. 4. The cooling medium 345 for cooler 342 is cooling water from the cooling water circuit 36 flowing into pipe line 40 as shown in FIG. 1. The cooled streams exiting coolers 340 and 342 through pipe lines 346 and 348, respectively, are joined in mixer 350 and exit as a single stream into a pipe line 352. However, before reaching the mixer 350, a stream of condensed water is separated into pipe line 354 and joined with the stream from pipe line 328 as a stream of condensate in pipe line 354. The stream of cooled compressed atmospheric air flowing through pipe line 352 is joined with the tail gas stream flowing through pipe line 358 (corresponding to pipe line 293 in FIG. 2) in mixer 359 and exits the mixer through pipe line 360.

The stream of compressed air flowing through pipe line 360 is delivered to compressed-air purification unit 304, in which traces of moisture and carbon dioxide are removed. The resulting stream of purified compressed air exits the Compressed Air Purification unit 304 through a pipe line 361 and is divided into two streams, one flowing into pipe line 364 and the other flowing into pipe line 366. The stream flowing through pipe line 364 is fed into cooler 368. The other stream flowing through pipe line 366 is divided into two streams, one of which flows into pipe line 370 which is directed to compressor 372 and the other into pipe line 374 which is directed into Turbo Air-Booster Compressor 376, which is integral with the Cold Box 302.

Figure 5:
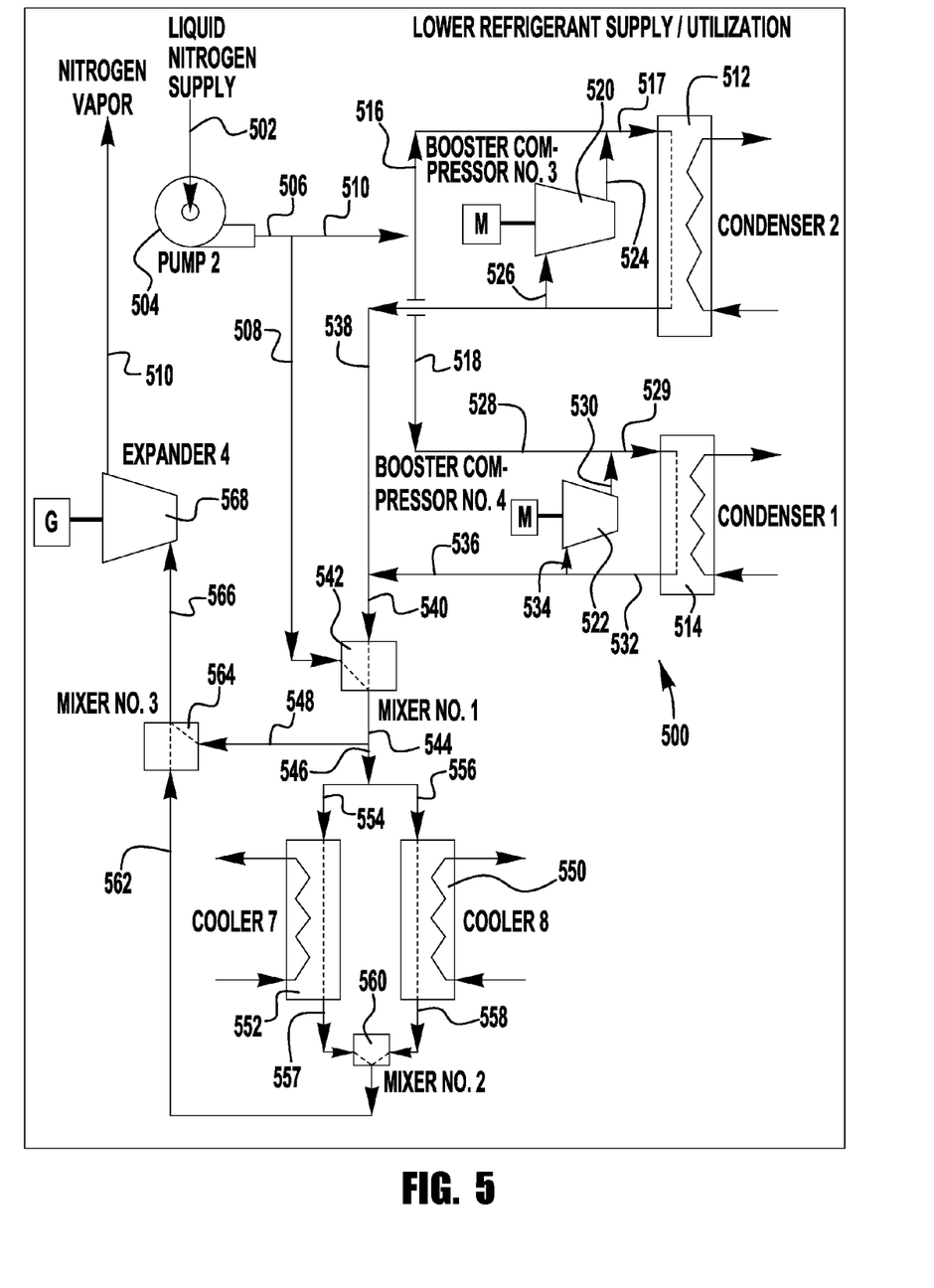
FIG. 5 illustrates the processing for the supply of the Lower Refrigerant and its utilization, according to the present invention.

The stream flowing through pipe line 364 is fed into a cooler 368 and exits as a cooled stream into pipe line 378, which enters the Cold Box 302. The cooling medium flowing into cooler 368 through pipe line 380 is nitrogen vapor as shown in FIG. 5 as stream 510. The stream of heated nitrogen vapor exits cooler 368 through pipe line 381 and is then split into two streams 383 and 314. The stream of nitrogen 314 is withdrawn as recycle on occasions when recycling is required and fed for mixing with the stream flowing through pipe line 310 into the Mixer 312. The stream of nitrogen flowing through pipe line 383 is vented to the atmosphere.

The compressed air stream from compressor 372 is directed through pipe line 384, cooled in cooler 385, and then fed through pipe line 386 to the Cold Box 302. The cooling medium 387 for cooler 385 is the Lower Refrigerant as shown in FIG. 5.

The compressed air stream flowing through pipeline 388 from the Booster Compressor 376 is cooled in cooler 389 and fed through pipe line 390 into the Cold Box 302. The cooling medium 391 for the cooler 389 is the Lower Refrigerant as shown in FIG. 5.

Conventional processing within the Cold Box 302 separates the compressed air streams through pipe lines 378, 386, and 390 into a stream of high-purity oxygen vapor and as a stream of high-purity nitrogen liquid which may contain argon. The stream of high-purity oxygen vapor is delivered into pipe line 391 at near ambient temperature and pressure. The stream of high-purity nitrogen liquid, which may contain argon, at near ambient pressure is delivered into pipe line 392. The argon content of atmospheric air is delivered as part of the liquid nitrogen product or, optionally, can be delivered from the Cold Box 302 as a separated product.

FIG. 4 illustrates the processing for the Upper Refrigerant in the Thermal-Energy Conversion Component 400 (Compare 14 in FIG. 1). The process begins with a stream of the Upper Refrigerant, which exits pump 404 as a liquid at elevated pressure being directed into pipe line 402. The liquid Upper Refrigerant is at a minimized temperature that avoids freezing of the moisture in the gaseous emissions being cooled in Coolers 406, 408, 410, and the atmospheric air being cooled in Cooler 412. The liquid stream of the Upper Refrigerant flowing through pipe line 402 divides into four streams flowing through pipe lines 414, 416, 418 and 420. The streams flowing through pipe lines 414, 416, 418 and 420 enter coolers 406, 408, 410, and 412, respectively, and exit the coolers through pipe lines 422, 424, 426 and 428, respectively.

The effluents from the coolers 406, 408, 410, and 412, now vaporized, are combined at elevated pressure and flow through pipe line 430. The vaporization occurs because of the thermal energy received from the media cooled in the four coolers. For coolers 406, 408, and 410, the media 432, 434 and 436, respectively, are the cooling of the gaseous emissions from pipe lines 219, 235, and 251 in FIG. 2. For cooler 412, the medium 438 is the cooling of the compressed air stream in pipe line 320 in FIG. 3.

The pressure in the stream through pipe line 430 is reduced in expander 439 and then flows through pipe line 440 into cooler 442 where it is reheated by the cooling of compressed air (the stream through pipe line 336 in FIG. 3). The reheated stream exiting the cooler 442 is directed through pipe line 444 into expander 446 in which the pressure is reduced to a level selected to enable the temperature level required for the stream flowing through pipe line 402. The two expanders 439 and 446 are represented in FIG. 1, illustratively, as expander 80.

The stream of effluent flowing from pipe line 448 from expander 446 is fed into condenser 450, which accommodates recirculation of the streams through pipe lines 452 and 454 of uncondensed Upper Refrigerant by Booster Compressor 456. The condensing medium is the Lower Refrigerant (the stream through line 517 in FIG. 5). The stream of condensed Upper Refrigerant is fed to Flash Drum 458 through pipe line 460. The stream of liquid exiting the Flash drum 458 through pipe line 462 is increased in pressure to the required level by pump 404.

FIG. 5 shows the processing for the supply of the Lower Refrigerant and its utilization. Illustratively, liquid nitrogen is selected as the Lower Refrigerant, its source being the Air-Separation Sub-Component 500 (compare 300, stream 392, in FIG. 3). The pressure of the stream of liquid nitrogen in pipe line 502 received at near ambient pressure is increased by pump 504 and directed as a stream into pipe line 506. The stream flowing through pipe line 506 is divided into streams 508 and 510. The division is determined by the consumption of the Lower Refrigerant in the condensers 512 and 514, with the excess becoming the stream flowing through pipe line 508.

The stream flowing through pipe line 510 further divides into streams flowing through pipe lines 516 and 518. The stream through pipe line 516 serves the condenser 512 for condensing the Upper Refrigerant (the condenser 450 in FIG. 4) and the stream through pipe line 518 serves the condenser 514 for condensing the captured carbon dioxide (the condenser 287 in FIG. 2). The condensing conditions in each case are set to avoid freezing of either the Upper Refrigerant or of the captured carbon dioxide. The means to avoid freezing, illustratively, is recirculation of a portion of the condensing medium through booster compressors 520 and 522.

For condenser 512, the temperature of the stream being inputted through line 517 is adjusted by the amount of recirculation of the stream through pipe line 524 and the amount of Lower Refrigerant flowing as a stream through pipe line 516. The effluent stream from Condenser 512 supplies the recirculation stream through pipe line 526. The remainder of the effluent stream from Condenser 512, which is stream 538, becomes equal to the flow rate for the stream through pipe line 516. Similarly for condenser 514, the temperature of the stream flowing though pipe line 529 is adjusted by the amount of recirculation of the stream flowing into pipe line 530 and the amount of the Lower Refrigerant flowing through pipe line 528. The effluent stream through pipe line 532 supplies the recirculation stream flowing through pipe line 534. The remainder flowing through pipeline 536 becomes equal to the flow rate for the stream flowing through pipe line 528.

The combined stream through pipe lines 538 and 536 flow into pipeline 540 as the demand for liquid Lower refrigerant requires, with surplus liquid Lower Refrigerant flowing through pipe line 508 into mixer 542 and exiting into pipe line 544.

The stream flowing through pipe line 544 divides into two streams flowing through pipe line 546 and pipe line 548. The stream flowing through pipe line 548 represents the quantity of Lower Refrigerant not required for the cooling functions in coolers 550 and 552. The stream flowing through pipe line 546 divides into two streams. The first of the streams flows through pipe line 554 and the second of the streams through pipe line 556. The stream from pipe line 554 exits cooler 552 (cooler 385 in FIG. 3) as a stream through pipe line 557, in which cooler 552 a portion of the purified compressed air in the Air Separation Component (the stream through pipe line 384 in FIG. 3), is cooled. The stream flowing through pipe line 556 exits cooler 550 (Cooler 389 in FIG. 3) as a stream through pipe line 558, in which cooler a portion of the purified compressed air in the Air Separation Component 12 (the stream through pipeline 388 in FIG. 3) is cooled.

The two streams through pipe lines 557 and 558 are combined in mixer 560 and exit the mixer as a stream flowing through pipe line 562. The stream through pipe line 562 is combined with the surplus stream flowing through pipe line 548 in mixer 564 and exits the mixer as a stream flowing through pipe line 566. The pressure in the stream through line 566 is reduced to near ambient in expander 568. The effluent stream exits the expander 568 through pipe line 510, which becomes the stream flowing through pipe line 380 in FIG. 3.

Other Embodiments

The foregoing descriptions of the features of the preferred embodiments have focused on an installation based on the embodiments (or configurations) illustrated in FIGS. 1 through 5 above. Nevertheless, it should be fully understood that an installation covered by this invention can be configured in alternative ways that meet the same objectives as discussed in the technical field of the Invention above. Some examples of alternative configurations, as other embodiments, are illustrative and follow.

Any configuration for this invention offers opportunities for modifying pressures and temperatures for the operating equipment that are embodied in a configuration. A primary objective for modifying pressures and temperatures is to achieve a reduction in the amount of externally supplied electricity required for the invention to operate (the stream through electric line 26 in FIG. 1).

The configuration in FIG. 1 is based on the supply of electricity from external sources (the stream through electric line 26). In this configuration all drivers for the compressors in FIGS. 2, 3, and 5 are electrical. Alternatively, some or all of these compressors can be driven by expansion turbines that employ high-pressure steam, either in a topping mode in which steam at a reduced pressure is returned to the source, or in a condensing mode in which condensed steam (i.e., feed water) is returned to the source.

In FIG. 2, processing of the Tail Gas (the stream through pipe line 293 in FIG. 2) can be eliminated and the tail gas vented to the atmosphere, thereby marginally reducing the amount of carbon dioxide capture. Also in FIG. 2, the liquefied carbon dioxide forming the stream through pipeline 297 is shown to be compressed to pressure suited to pipe line transport by pump 282. Alternatively, conventional processing may be introduced whereby any portion of the carbon dioxide that is captured as a high-pressure liquid flowing through pipe line 297 is detoured for conversion to a solid product (dry ice), or as lower pressure feedstock suited for chemical production feedstock, or for algae cultivation, as examples.

In FIG. 2 the number of stages of compression shown to produce the stream flowing through pipeline 267 is illustrative. The number may be larger or smaller with the number of intercoolers adjusted to suit. Moreover and alternatively, initial cooling and major condensation of the water vapor content in the gaseous emissions may be accomplished by introducing an additional cooler and separator within stream 209 or stream 215, with the use of the Upper Refrigerant as the cooling medium. Thus, the flow rate and the temperature of the gaseous emissions fed to the first-stage compressor 217 are reduced as well as its power consumption. This embodiment adds an additional cooling load to be accommodated in the downstream processing of stream 430 in FIG. 4.

In FIG. 2, the cryogenic capture of carbon dioxide as a liquid at high pressure may alternatively be replaced by the use of a process involving specialized inorganic or organic chemical agents. For example, ammonium carbonate/bicarbonate and organic amine solutions have properties of selectively absorbing carbon dioxide from a mixture of gases at one set of pressure and temperature and liberating (desorbing) the absorbed carbon dioxide at another set of pressure and temperature. The carbon dioxide thus captured may then be compressed and cooled at a pressure suited to pipe line transport with associated low-level thermal energy captured and converted to electricity as described above.

In FIG. 2 the solid carbon dioxide "snow" may be further processed either, or both, by compression to solid blocks of dimensions suited to marketing conditions or as a liquid under elevated pressure suited to blending with the main liquid carbon dioxide stream. Stream 292 in FIG. 2 can produce carbon dioxide "snow", compressed carbon dioxide blocks, and liquid carbon dioxide. In the case of liquid carbon dioxide, Line 292 in FIG. 2 would be extended and connected to Line (Stream) 297 at the inlet of Pump No. 3.

In FIG. 3, the cooling medium for cooler 322 may be water from the cooling water circuit 36 in FIG. 1 instead of the Upper Refrigerant. Also in FIG. 3, the cooling medium for cooler 340 may be water from the cooling water circuit. The cooling medium for the coolers 385 and 389 may be the Upper Refrigerant instead of the Lower Refrigerant. Cooler 368 may be eliminated and the cooling medium flowing through line 380 vented directly to the atmosphere.

In FIG. 3, the stream of liquid nitrogen flowing through line 392 is produced as refrigerant for Condensers 512 and 514 in FIG. 5. Occasions may arise, such as instances where a portion of the oxygen required for the OxyFuel mode (the stream flowing through line 28 in FIG. 1) is supplied from external sources, where consequently the quantity of liquid nitrogen produced for the stream flowing through line 392 in FIG. 3) is less than what is required for Condensers 512 and 514 in FIG. 5. In such cases, a portion of the nitrogen vapor (the stream through pipeline 314 in FIG. 3 may be directed for mixing with the atmospheric air input (the stream flowing through pipeline 310 in FIG. 3), thereby establishing a recirculation stream to produce the required liquid nitrogen output through the pipeline 392 in FIG. 3.

Moreover and alternatively, initial cooling of atmospheric air and condensation of its content of water vapor may be accomplished by introducing an additional cooler and separator within stream 306 or stream 310, with the use of the Upper Refrigerant as the cooling medium. Thus, the temperature of the atmospheric air and its moisture content fed to the first-stage compressor 318 are reduced, as well as its power consumption. The alternative adds an additional cooling load to be accommodated in the downstream processing of stream 430 in FIG. 4.

In FIG. 4 the thermal energy transferred in cooler 442 is used to reheat the partially expanded Upper Refrigerant vapors flowing through pipeline 440 from the Expander 439. This function can also be accomplished, alternatively, through substitution of cooler 442 by another cooler.

In FIG. 4, the number of turbo-expansion stages is illustrative. For example, three stages of expansion can be configured, in which the reheating function in cooler 442, for example, is complemented by an additional expander and an intercooler from the available roster of coolers.

In FIG. 5, the discharge pressure from Pump 504 can be selected such that excess liquid Lower Refrigerant flowing through pipeline 508 is minimized, if not eliminated. In addition, as described above, the cooling function in coolers 550 and 552 can be accomplished with the Upper Refrigerant instead of the Lower Refrigerant.

In FIG. 5, the stream flowing through pipeline 508 represents an excess of the Lower Refrigerant that is by-passed to mixer 542. Such by-passing is thermally inefficient. If an external supply of oxygen is available, the capacity of the Air Separation Component (12 in FIG. 1) can be reduced such that the quantity of by-pass of the Lower Refrigerant is minimized. At the same time the quantity of external electricity flowing through electric line 26 in FIG. 1 is reduced.

Figure 6:
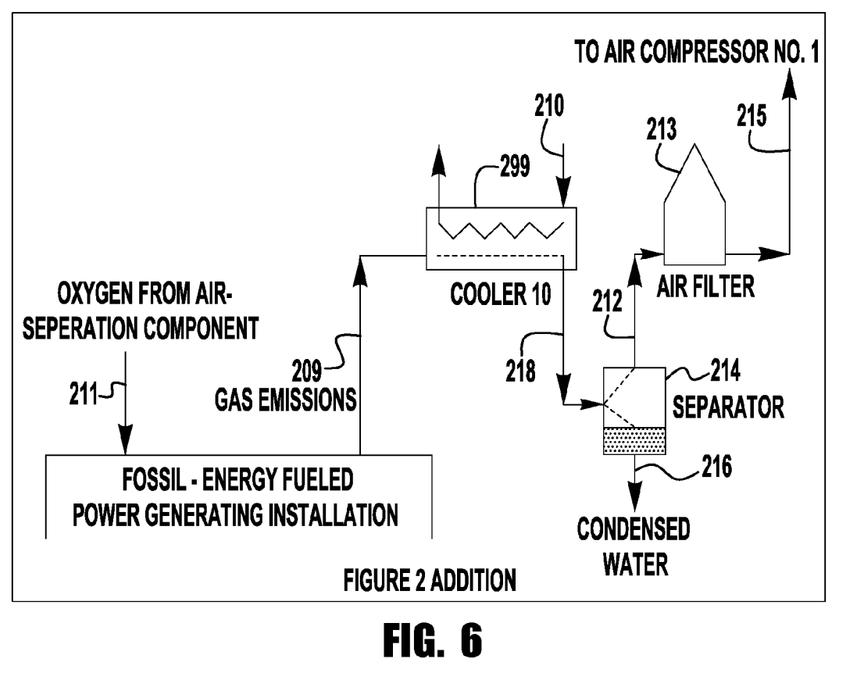
FIG. 6 illustrates an alternative configuration to that shown in FIG. 2 with respect to the receipt of gaseous emissions from fossil-energy power generation, according to the present invention.
Figure 7:
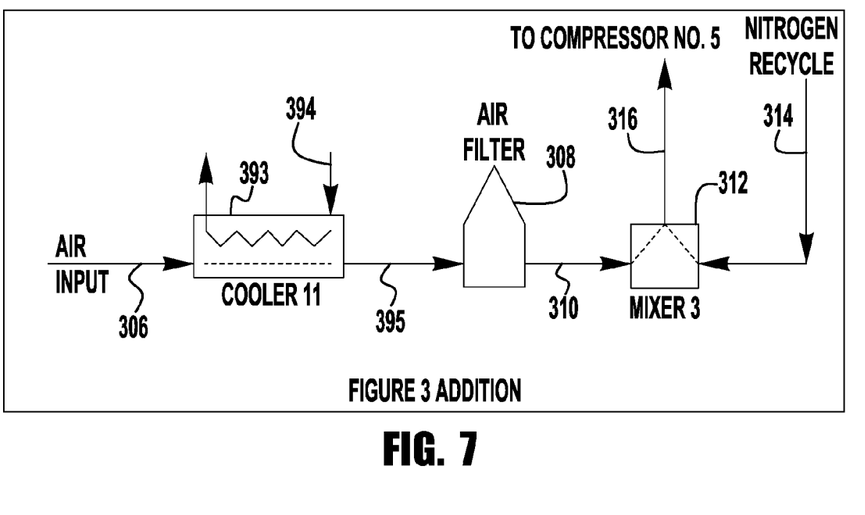
FIG. 7 illustrates the alternative configuration to that shown in FIG. 3, with respect to the receipt of atmospheric air, according to the present invention.
Figure 8:
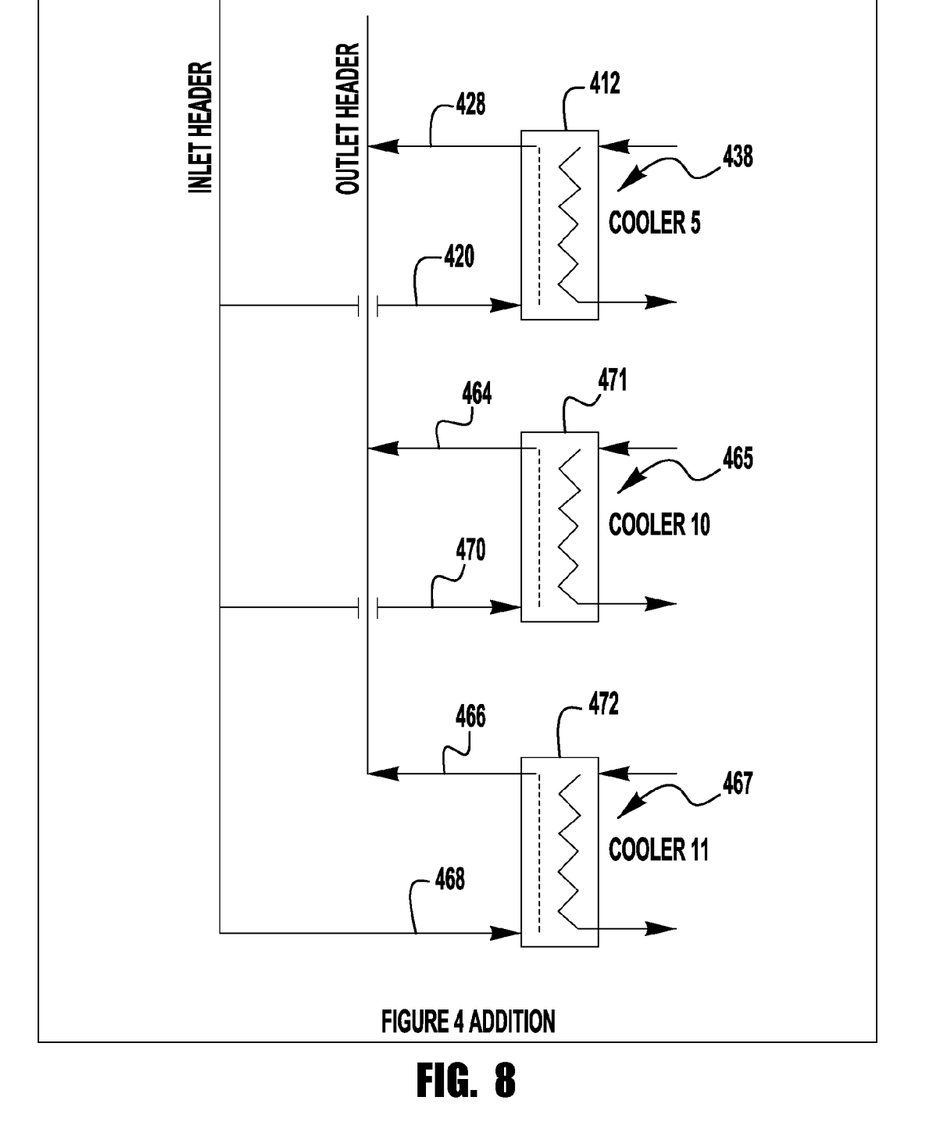
FIG. 8 shows the alternative configuration to that shown in FIG. 4, with respect to the inclusion of the two new Coolers 299 and 393, according to the present invention.

FIGS. 6, 7, and 8 describe alternative configurations to those illustrated by FIGS. 2, 3, and 4. These alternatives in principle acts to reduce the temperature of the gaseous emissions entering the Carbon-Dioxide Capture Component and the temperature of the atmospheric air entering the Air Separation Component. The means for accomplishing the reductions in temperature is the Upper Refrigerant. In the descriptions of FIGS. 6, 7, and 8, the numbering of streams and equipment is unchanged, except for new numbering of streams and equipment that are introduced.

FIG. 6 illustrates the alternative configuration to that shown in FIG. 2 with respect to the receipt of gaseous emissions from fossil-energy power generation. Stream 209 connects the gaseous emissions from a fossil-energy fueled power generating installation to a new Cooler 299, in which the reduction in temperature of Stream 209 occurs. The cooling medium 210 is the Upper Refrigerant. Stream 209 exiting from Cooler 299 as stream 218 connects with Separator 214 in which the water that has been condensed from stream 209, because of the reduction in temperature in Cooler 299, is separated and removed as stream 216. The residual vapor flowing from the Separator 214 as stream 212 enters the Air Filter 213 as stream 212 for the removal of any residual particulates. Flow stream 215 leaving the Air Filter 213 connects with Compressor No. 1 as in FIG. 2. Flow stream and equipment configurations subsequent to Compressor No. 1 (217 in FIG. 2) are identical with those shown in FIG. 2.

FIG. 7 illustrates an alternative configuration to that shown in FIG. 3, with respect to the receipt of atmospheric air. Stream 306 connects the atmospheric air input to a new Cooler 393, in which the reduction of temperature of stream 306 occurs. The cooling medium 394 flowing through cooler 393 is the Upper Refrigerant. Stream 395 exiting from Cooler 393 is directed into the Air Filter 308. Flow stream 310 leaving the Air Filter 308 is directed into Mixer 3 (312) as shown in FIG. 3. Mixer 3 (312) also receives the nitrogen recycle stream 314. Flow stream and equipment configurations subsequent to flow stream 316 from Mixer 3 (312) are identical with those shown in FIG. 3.

FIG. 8 shows an alternative configuration to that shown in FIG. 4, with an inclusion of two additional Coolers 471 and 472 illustrated as being disposed below Cooler 11 in FIG. 4. The inlet and outlet headers now serve the additional Coolers 471 (210 in FIG. 6) and 472 (393 in FIG. 7). Stream 465 is the flow stream 209 in FIG. 2. Stream 467 is the flow stream 306 in FIG. 3. Cooler 10 (471) receives high-pressure Upper Refrigerant liquid as stream 470 and discharges high-pressure Upper Refrigerant vapor as stream 464. Cooler 11 (472) receives high-pressure Upper Refrigerant liquid as stream 468 and discharges high-pressure Upper Refrigerant vapor as stream 466. High-pressure, liquid Upper Refrigerant feed to the Inlet Header and receipt of high-pressure, vapor Upper Refrigerant from the Outlet Header are identical as shown in FIG. 4. Processing of the flow stream from the Outlet Header through to the supply of Upper Refrigerant to the Inlet Header is identical as shown in FIG. 4.

In the description of this above, the basis has been the supply of the oxygen requirement in the OxyFuel mode of combustion entirely by means of an air separation component. However, it is possible that an external supply of oxygen is conveniently available, which can reduce, if not eliminate the need for air separation to provide the oxygen supply. An example of this possibility is the presence of an installation adjacent to an installation based on this invention in which algae is cultivated through the process of photosynthesis in which oxygen is a by-product. Another example is the possible presence of a nearby air separation installation supplying oxygen to another market, which is not large enough to absorb the available oxygen supply, the surplus then becoming available for supply to an installation based on this invention.

If no external supply of oxygen is available, the likelihood is that the nitrogen quantity separated in the Air Separation Component will be adequate, if not more than adequate, to supply the required quantity of the Lower Refrigerant. If this is not so, or if an external supply of oxygen is available, some of the vented oxygen (Stream 314 in FIG. 3) can be by-passed for addition to the atmospheric air (Stream 310 in FIG. 3) to increase the output of Lower Refrigerant from the Air Separation Component of this invention.

However, it is possible that a more technologically attractive alternative is available to assure an adequate supply of Lower Refrigerant. Instead of the Stream 314 (FIG. 3) being destined for mixing with atmospheric air, this stream can be subjected as feedstock to a conventional nitrogen liquefaction installation, separated from air separation in the air separation component.

Although the invention has been shown and described with respect to a certain preferred embodiment or embodiments, certain equivalent alterations and modifications will occur to others skilled in the art upon the reading and understanding of this specification and the annexed drawings. In particular regard to the various functions performed by the above described components (assemblies, devices, etc.) the terms (including a reference to a "means") used to describe such components are intended to correspond, unless otherwise indicated, to any component which performs the specified function of the described component (i.e., that is functionally equivalent), even though not structurally equivalent to the disclosed structure, which performs the function in the herein illustrated exemplary embodiments of the invention. In addition, while a particular feature of the invention may have been disclosed with respect to only one of several embodiments, such feature may be combined with one or more features of the other embodiments as may be desired and advantageous for any given or particular application.

The invention claimed is:

1. A method for extracting and exporting carbon dioxide content in gaseous emissions received from a fossil-energy fueled power generating installation, operating in an oxyfuel mode, which comprises a structure of three interrelated and simultaneously functioning components, wherein the three interrelated and simultaneously functioning components are a carbon dioxide capture component, an air separation component and a thermal energy conversion component for producing gaseous oxygen from atmospheric air and tail gas to support oxyfuel mode operation of fossil-energy fuel power generating installation, and for recovering and using internally produced low-temperature thermal energy to generate electricity to reduce external electricity supply requirements of the three interrelated and simultaneously functioning components that integrate as a single installation in which each of the three interrelated and simultaneously functioning components is dependent on one or more inputs received from the other two components, comprising:

the carbon dioxide capture component functions to extract and export the carbon dioxide from the gaseous emissions received from the fossil-energy fueled power generating installation, the carbon dioxide being cryogenically extracted from the gaseous emissions through multi-stage compression incorporating intercoolers and aftercoolers, and the carbon dioxide extracted from the gaseous emissions being condensed with a lower refrigerant received from the air separation component to produce liquid carbon dioxide and pressurization of the liquid carbon dioxide condensed by the lower refrigerant for pipeline transport, and to separate non-condensable content of the gaseous emissions to form the tail gas which contains oxygen and nitrogen and to deliver the tail gas to the air separation component;

the air separation component functions to separate oxygen content from nitrogen content of the atmospheric air entering the air separation component and the tail gas from the carbon dioxide capture component by distillation under cryogenic conditions, to provide gaseous oxygen for export to the fossil-energy fueled power generating installation which supplies the gaseous emissions, in order to support operation of the fossil-energy fueled power generating installation in the oxyfuel mode, to provide liquid nitrogen to serve as the lower refrigerant for condensing the carbon dioxide in the carbon dioxide capture component and to serve as the lower refrigerant in the thermal energy conversion component for condensing the upper refrigerant, to supply pressurized atmospheric air for cryogenic distillation that separates oxygen from nitrogen through multi-stage compression incorporating intercoolers and aftercoolers, and to receive the tail gas from the carbon dioxide capture component to supplement the atmospheric air entering the air separation component; and the thermal energy conversion component functions to generate electricity from thermal energy received from the intercoolers and aftercoolers in the carbon dioxide capture component and in the air separation component through evaporating the liquid upper refrigerant at an elevated pressure into a vaporized upper refrigerant at an elevated pressure through heat exchange in the intercoolers and aftercoolers in the carbon dioxide capture component and in the air separation component, reducing the elevated pressure of the vaporized upper refrigerant in turbo-expanders, and condensing the vaporized upper refrigerant after reducing the elevated pressure to restore the upper refrigerant to a liquid through heat exchange with the lower refrigerant of liquid nitrogen in the air separation component.

2. The method of claim 1 including driving compressors within the carbon dioxide capture component with turbines operated with steam supplied from the fossil-energy fueled power generating installation operating in the oxyfuel combustion mode.

3. The method of claim 1 including:

pre-cooling gaseous emissions received by the carbon dioxide capture component from the fossil-energy fueled power generating installation operating in the oxyfuel combustion mode by heat exchange with the upper refrigerant, in the thermal energy conversion component;

partially drying the gaseous emissions from the fossil-energy fueled power generating installation by cooling the gaseous emissions to a temperature at which their moisture content condenses to a condensate and partially dried gaseous emissions; and separating the condensate and feeding the partially dried gaseous emissions to a first stage of the multi-stage compression in the carbon dioxide capture component.

4. The method of claim 1 including isolating and extracting the carbon dioxide content of the tail gas as a liquid and adding the liquid carbon dioxide from the tail gas to the condensed liquid carbon dioxide produced in the carbon dioxide capture component.

5. The method of claim 4 including:

further reducing the pressure of the tail gas within the carbon dioxide capture component thereby isolating and extracting the carbon dioxide content of the tail gas in the carbon dioxide capture component as a solid;

vaporizing the solid carbon dioxide content of the tail gas under pressure to liquid carbon dioxide; and adding the liquid carbon dioxide from vaporizing the solid carbon dioxide content of the tail gas under pressure to the liquid carbon dioxide condensed with the lower refrigerant received from the air separation component in the carbon dioxide capture component.

6. The method of claim 1 including:

supplying thermal energy for collection by the upper refrigerant which has been restored to the liquid upper refrigerant within the thermal energy conversion component from the intercoolers and aftercoolers in the air separation component;

supplementing the atmospheric air separated by the air separation component with tail gas from the carbon dioxide capture component;

providing the lower refrigerant to the carbon dioxide capture component for the condensation of the carbon dioxide extracted from the gaseous emissions; and providing the lower refrigerant for the condensation of the upper refrigerant within the thermal energy conversion component.

7. The method of claim 6 including driving compressors within the air separation component with turbines operated with steam supplied by the fossil-energy fueled power generating installation operating in the oxyfuel combustion mode.

8. The method of claim 6 including pre-cooling the atmospheric air being input into the air separation component by heat exchange with the upper refrigerant supplied by the thermal-energy conversion component, wherein the atmospheric air is partially dried by cooling to a temperature at which moisture content of the atmospheric air condenses and the condensed moisture content is separated followed by feeding the partially-dried atmospheric air to a first stage of multi-stage compression in the air separation component.

9. The method of claim 6 including adding tail gas received by the air separation component to one of the stages of multi-stage compression within the air separation component thereby reducing the quantity of the atmospheric air input to the air separation component.

10. The method of claim 6 including using the liquid nitrogen supplied within the air separation component as the lower refrigerant within the carbon dioxide capture component for condensing carbon dioxide from the gaseous emissions.

11. The method of claim 6 including using liquid nitrogen supplied within the air separation component as the lower refrigerant within the thermal-energy conversion component, for condensing the upper refrigerant.

12. The method of claim 6 including providing a portion of the oxygen required for oxyfuel combustion in the fossil-energy fueled power generating installation from external sources.

13. The method of claim 12 including providing a supplementary nitrogen liquefaction installation to increase the supply of liquid nitrogen lower refrigerant to meet combined demand when a portion of the oxygen supply to support oxyfuel combustion in the fossil-energy fueled power generating installation, operating in the oxyfuel combustion mode, is supplied from external sources.

\* \* \* \* \*